United States Patent [19]

Carlsen

[11] 3,891,976

[45] June 24, 1975

[54] HOLOGRAM MEMORY WITH SEQUENTIAL DATA STORAGE AND BEAM ANGULAR RELATIONSHIP

[75] Inventor: W. John Carlsen, Natick, Mass.

[73] Assignee: GTE Laboratories Incorporated, Waltham, Mass.

[22] Filed: Jan. 14, 1974

[21] Appl. No.: 432,912

[52] U.S. Cl. .................... 340/173 LM; 178/6.7 R; 340/173 LT; 350/3.5

[51] Int. Cl.[2] .................... G11C 13/04; G02B 27/38

[58] Field of Search ............... 340/173 LM, 173 LT; 350/3.5; 178/6.7 A, 6.7 R; 179/100.3 G; 346/76 L

[56] References Cited

UNITED STATES PATENTS

| | | | |
|---|---|---|---|
| 3,407,405 | 10/1968 | Hoadley | 340/173 LM |
| 3,408,656 | 10/1968 | Lamberts | 340/173 LM |
| 3,622,794 | 11/1971 | Pond et al. | 340/3.5 |
| 3,657,473 | 4/1972 | Corcoran | 350/3.5 |
| 3,720,921 | 3/1973 | Schools et al. | 340/173 LM |
| 3,774,986 | 11/1973 | Bourgoin et al. | 350/3.5 |

*Primary Examiner*—Stuart N. Hecker
*Attorney, Agent, or Firm*—Irving M. Kriegsman; Bernard L. Sweeney

[57] ABSTRACT

A holographic data processing apparatus is described wherein data is holographically recorded on a recording medium with the data arranged in groups of superimposed holograms of data bits. An optical data beam and an optical reference beam are passed through deflectors to intersect to form the local holographic pattern at the recording medium. The location of intersection is controlled by a page deflector and the angle of intersection is controlled by a data deflector. Each data bit is recorded with a distinct angular relationship between the intersecting data and reference beams. During reconstruction the data at a page location are projected from the recording medium in an array wherein the position of each data bit is related to the discrete recording angle. A feedback arrangement to maintain registration of the beams is described.

14 Claims, 5 Drawing Figures

HOLOGRAM MEMORY WITH SEQUENTIAL DATA STORAGE AND BEAM ANGULAR RELATIONSHIP

FIELD OF THE INVENTION

This invention relates to an improved method and apparatus for storing and retrieving digital data utilizing holograms and more specifically, to an improved method and apparatus for recording data in such holographic memories.

BACKGROUND OF THE INVENTION

The use of holograms to store digital data is well known in the art. A conventional holographic data memory is formed by initially arranging data to be recorded in an array. This array is initially composed as a page of data and placed in an intermediate storage device commonly referred to as a "page composer." The page composer is usually an array of cells, each of which is made opaque or transparent according to whether a binary 0 or 1 is to be stored at that particular cell address. After the page has been formed, it is illuminated with laser light and holographically recorded on a hologram storing medium.

Several formats for recording a large number of such pages in a single hologram memory have been reported. In one such format a page array of small transparent cells is composed. This page is then holographically recorded on a photographic medium as a single hologram by illuminating the transparent page composer with laser light and guiding the transmitted laser light onto a small area of the recording medium along with a reference beam. Following the recording of a page, another page is composed in the page composer, and likewise recorded with the reference beam but in another area of the recording medium. This process is continued until all the data is recorded.

Another format, but less commonly employed, involves the use of angular selectivity inherent in the recording of so-called Lippmann-Bragg volume holograms. Such holograms are formed throughout the volume of a thick recording medium instead of on a planar thin recording surface. In a volume holographic recording, each page is superimposed upon the other on the same area of the recording medium; however, with each exposure the reference beam is incident on the medium from a different recording angle.

During the playback or read-out of data from holograms formed according to the former methods, a reference laser beam is employed. In the previously described first format, the reference beam is directed onto the small area including the hologram with its page array of data. The image of the original page composer with its array of data in the form of light and dark spots for that page is then reconstructed. The reconstructed page is projected in a detection plane where an array of photodetectors is placed to interrogate each individual data bit.

The projected data array are then read out electronically with the photodetectors which sense the presence or absence of light at each bit position in the imaged array. The read-out of a page from a Lippmann-Bragg volume holographic memory is done in a similar manner. A reference beam is directed onto the volume hologram from the specific angle used to record that particular page and the resulting data array is imaged and reconstructed for electronic detection. Other pages in the volume hologram memory are accessed by orienting the reference beam at different angles.

These prior art methods for recording and playback of data present disadvantages. For example, the parallel recording of an entire page of data involves the simultaneous illumination of all data bits on the page composer with a common optical beam. Such simultaneous illumination creates intermodulation noise caused by the interference of rays from individual data bits at the recording medium. During read-out, such noise results in a flare of diffracted light for which special care must be taken to keep the flare from creating detection interference on the electronic detector plane. Failure to take such precautions causes serious signal to noise problems. In order to avoid flare problems, the read-out involves using reference beams at a relatively large angle from the data beam to prevent the flare from falling directly onto or from being scattered onto the detector plane. Since no data bits can be recorded within a minimum solid angle around the reference beam, where the flare is located, that minimum part of the storage capacity of the holographic recording medium around the reference beam is essentially wasted.

Another disadvantage of the prior art systems involves the requirement that a full page of data must be temporarily stored to enable an optical version to be composed followed by subsequent storage on the holographic recording medium.

Another disadvantage arises by virtue that a substantial amount of laser beam power is wasted through losses encountered with the page composer which is opaque in many places such as the areas where zeroes are stored, the areas between the data, unused addresses and border areas. Consequently, much of the laser light used to illuminate the page composer is not transmitted and recorded, but wasted by absorption. Hence, for any given laser beam power that may be available, the time to store data will be significantly longer than in comparison with a storage method with which all of the laser power could be used to record.

The page composer required in prior art holographic data memory devices involves a complex structure utilizing many individually addressable electro-optical light-valve cells, of the order of 10,000 or more, to enable fast storage and fast erasure. Such composer is extremely complex to design and produce and thus represents a generally undesirable component in a hologram memory storing system.

SUMMARY OF THE INVENTION

In a holographic memory apparatus in accordance with the invention, a sequential storage technique is used to directly input one data bit at a time into the hologram memory or onto the recording medium as the bit arrives at inputs to the system. In this manner, a page composer is eliminated and full laser beam power is available to record the data. A holographic memory system in accordance with the invention provides high speed recording with high storing densities for an efficient operation.

As described with reference to a preferred embodiment for a holographic recording and retrieval apparatus in accordance with the invention, a reference laser beam and a data laser beam are formed with both beams being intensity modulated in accordance with the data to be recorded. The reference and data beams are then made incident upon a recording medium, such as a photographic plate, located in a recording plane. The locations of the data and reference beam intersections in the holographic recording plane are selected in correspondence with the address for a page of data. The term page being used herein to denote a group or block of data bits of predetermined number grouped for recording together and display in an array.

Each individual data bit in a group is holographically recorded with a preselected recording angle between the data and reference beams. Hence, for each data bit in a page there exists a particular intersection angle at the recording medium, such intersection angle serving as the address information for the bits in a page or group. The plurality of data bits within a page are recorded on the medium by superimposing the bits upon each other to form a localized multiple exposure synthetic page hologram. An entire array of such pages or groups of holograms may thus be conveniently recorded on the medium at respectively different locations.

During playback, the reference beam is directed onto the page location where information is to be retrieved from and the resulting reconstructed image of the array of data bits projected or imaged in a detector plane. Light detectors located in the detection plane convert the data bits to electrical signals for subsequent use by a data processor such as a computer and the like.

The advantages of a holographic data recording and playback system in accordance with the invention include a higher optical power available for recording without disturbing intermodulation flare effects and an elimination of a page composer to permit a direct, fast recording of information.

It is, therefore, an object of the invention to provide a rapid holographic memory recording and playback apparatus of simpler construction and suitable for storing an enormous quantity of data.

BRIEF DESCRIPTION OF DRAWINGS

These and other advantages and objects of the invention will be understood from the following description of a preferred embodiment in conjunction with the drawings wherein.

DETAILED DESCRIPTION OF EMBODIMENT

Figures 1, 4, 5:
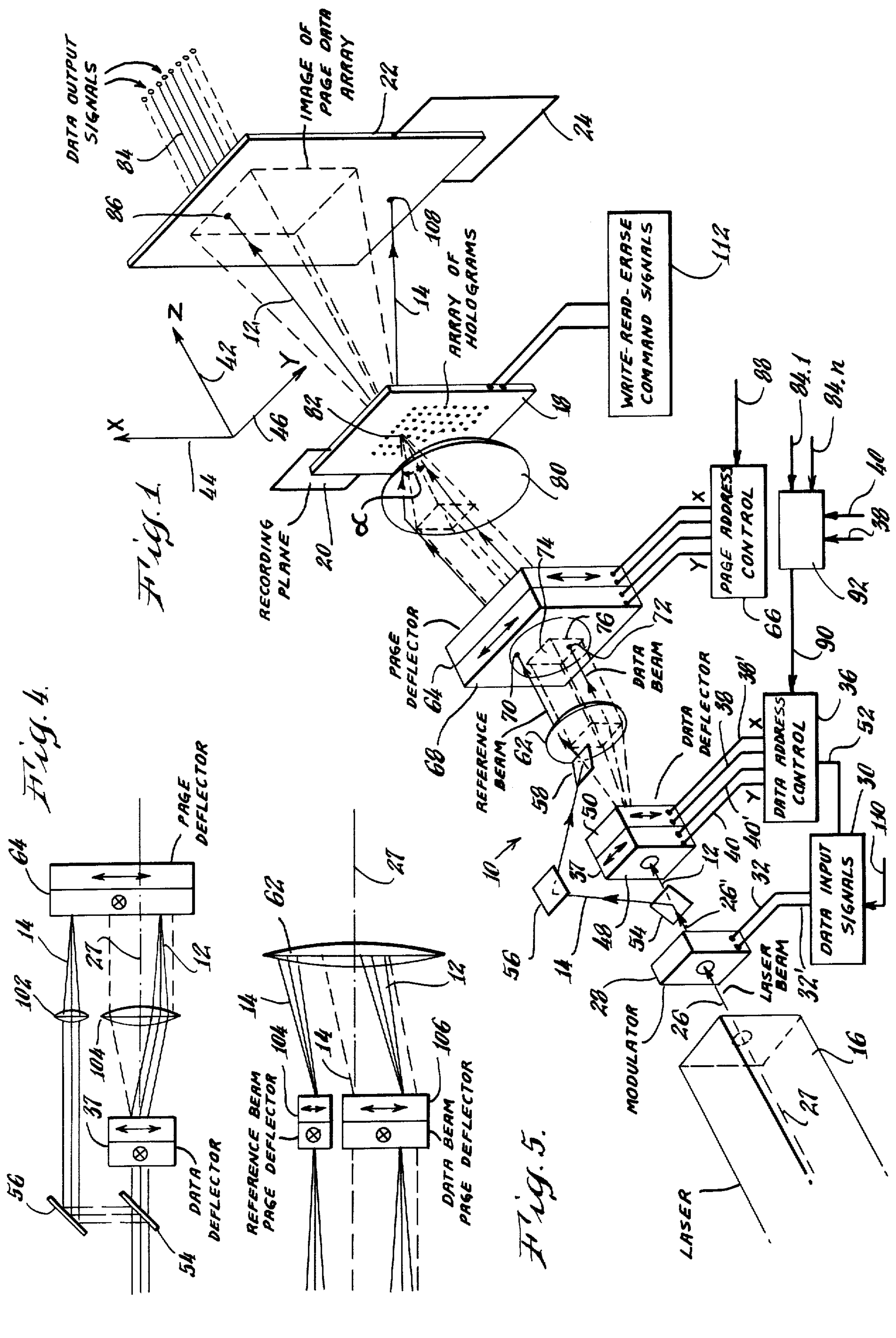
FIG. 1 is a perspective schematic view of a holographic recording and playback memory in accordance with the invention.
FIG. 4 is a schematic view of an alternate form for the beam deflection portion of the holographic memory shown in FIG. 2.
FIG. 5 is a schematic view of an alternate form for the page deflection portion of the hologram memory shown in FIG. 2.
Figure 2:
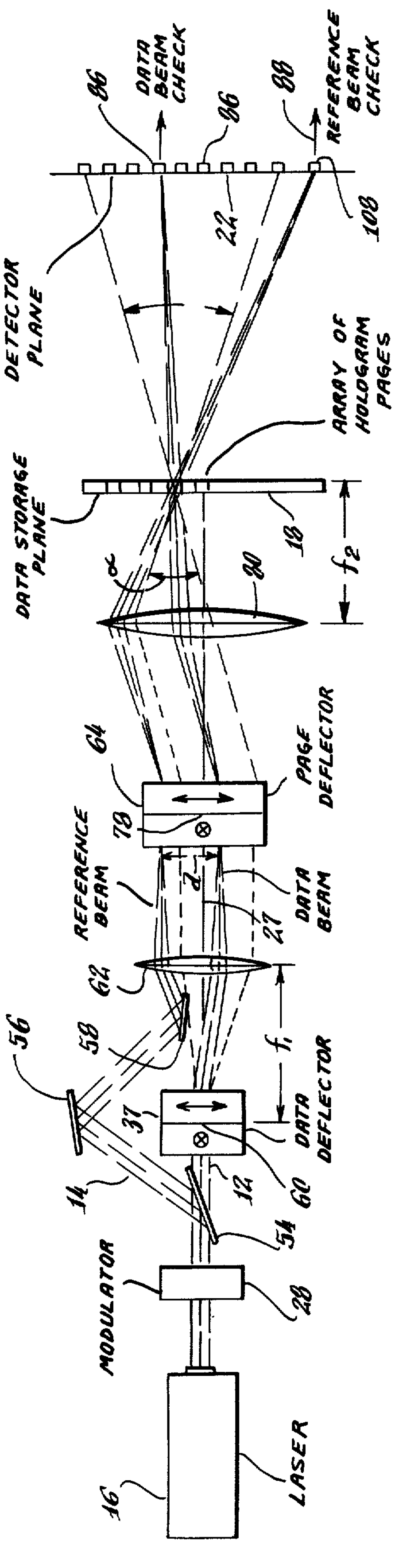
FIG. 2 is a side view of the holographic memory shown in FIG. 1.
Figure 3:
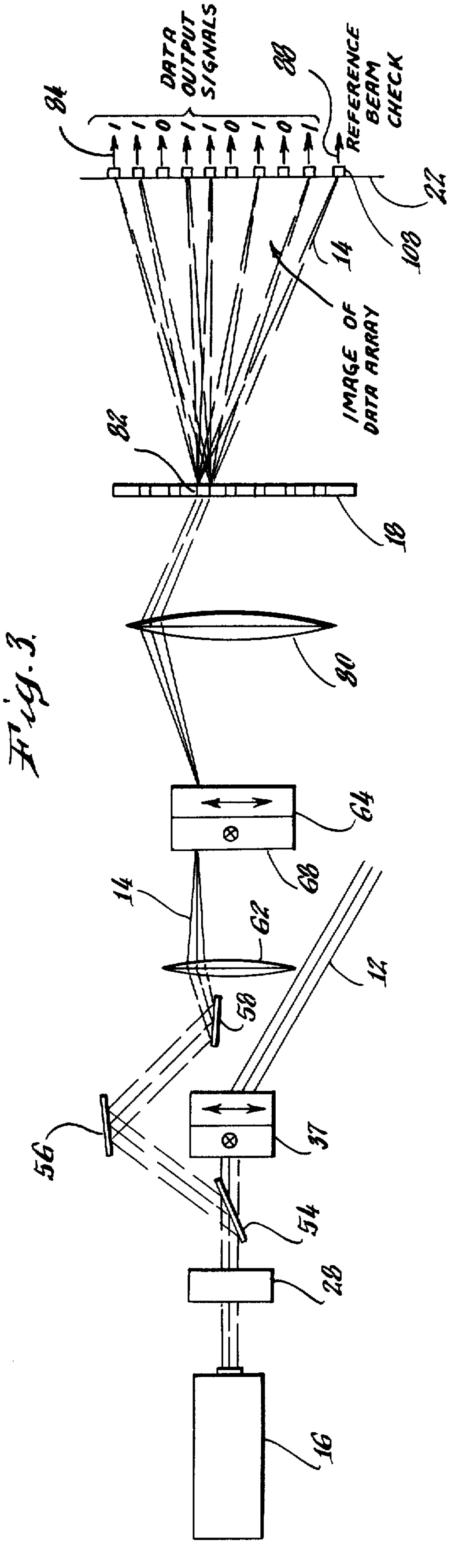
FIG. 3 is a similar side view of the holographic memory as shown in FIG. 2 but with optical beams shown in the operation of playback of stored data.

With reference to FIGS. 1, 2 and 3, a holographic recording and playback memory 10 in accordance with the invention is shown. The side views in FIGS. 2 and 3 show the employed laser beams, a data beam 12 and a reference beam 14, in greater detail to illustrate changes in beam width as the beams 12, 14 travel through system 10.

The holographic recording and playback memory 10 includes a laser 16 or other source of coherent and essentially monochromatic light. The laser source 16 may operate in the visible, infra-red or ultra-violet portions of the electromagnetic spectrum, depending upon the spectral sensitivities of a storage medium 18 located in a recording plane 20 and a light detector array 22 in a detector plane 24. The output of laser 16 is a laser beam 26 which is aligned coincident with an optical axis 27 onto a data modulator 28 which intensity modulates beam 26 in accordance with the data to be stored. A data signal source 30 provides modulation signals on lines 32–32′ to intensity modulate beam 26. The modulations from data signal source 30 results in the formation of zeroes and ones by, for example, respectively inhibiting or allowing the passage of laser beam 26 through modulator 28.

The modulated laser beam 26′ from modulator 28 is applied to a beam splitter 54 to produce reference beam 14 and a data beam 12 with both beams being modulated with data. Data beam 12 is applied to a data beam deflector 37 which deflects the data beam 12 according to $x$ and $y$ deflection signals on lines 38–38′ and 40–40′ generated by a data deflection source 36. It should be noted here that the optical axis 27 of system 10 is aligned parallel with the $z$ axis 42 of an orthogonal coordinate system as shown in FIG. 1 and that the recording plane 20 and detection plane 24 are transverse to the optical axis and parallel to the $x$ and $y$ axes 44, 46.

Data deflector 37 is capable of deflecting data beam 12 into a multitude of directions in two dimensions, $x$ and $y$, in a plane transverse to optical axis 27. Two stages of deflectors 48, 50 are used to respectively deflect data beam 12 in $y$ and $x$ axis directions. Data deflector 37 may be an electro-optical deflector or a moving mirror deflector. The angular deflection of data beam 12 is selected in correspondence with the desired angular relationship between reference beam 14 and data beam 12 during their intersection in the recording plane 20. The data deflection control signals on lines 38, 40 are synchronized to the modulation of the laser beam 26 as suggested by sync line 52 so that each bit is stored with a distinct angular relationship between data and reference beams 12 and 14.

The angular deflection of data beam 12 may be controlled, for example, to any of 500 discrete angular positions in each of the $x$ and $y$ directions. Thus a total angular array of 250,000 possible bit positions can be achieved for each recorded page. The specific deflector employed is not critical so long as each discrete deflection is the same for all of the rays within the data beam 12. The angle of intersection, $\alpha$, between the data and reference beams 12, 14 is thus an angle whose magnitude and rotational orientation are dependent upon the relative magnitudes of the $x$ and $y$ deflections imposed by the data deflector 37.

The reference beam 14 is directed by the beam splitter 54 and reflectors 56, 58 past data deflector 37 such that after the last reflection reference beam 14 appears to emerge or travel away from the intersection 60 of the optical axis 27 with the center of the scan of deflector 37. In this manner both the reference and data beams 14, 12 appear to diverge from a common fixed origin 60 located within deflector 37 and on the optical axis 27.

The deflected data beam 12 and the reference beam 14 are directed onto a first lens 62, which is aligned on the optical axis 27. The lens 62 is so placed as to intercept these two beams at a distance of one focal length, $f_1$, from the center of the scan 60 of deflector 37. Lens 62 serves to collimote the beams 12, 14 with their relative spatial relationship as expressed with the dimension $d$, and their relative positions being determinative of the positions of the data bits in the array produced upon reconstruction of the recorded bits. The spatial relationship is thus further determinative of the discrete recording or intersection angle $\alpha$ of the data and reference beams 12, 14 at the recording plane 20.

The parallel data and reference beams 12, 14 are applied to a second or page deflector 64. The page deflector 64, which may be an acousto-optical deflector, also provides two dimensional deflection of beams 12, 14 in the $x$ and $y$ directions in correspondence with the desired location of the page in the array of holograms in the recording plane 20. The deflection signals for page deflector 64 are obtained from a page address network 66 which determines, such as under control from a data processor, where the page of data is to be recorded on medium 18.

The parallel entry of the data and reference beams 12, 14 into page deflector 64 accommodate the requirement for some deflectors, such as acousto-optic deflectors, that the light beams to be deflected enter parallel to each other. For other types of deflectors, the beam position parameters may be changed over an extensive range as determined by the optical designer who may wish to optimize his design for a specific application and with particular components in mind.

Lens 62 directs the reference and data beams 14, 12 parallel to each other and optical axis 27 of lens 62. The rays, which constitute the individual beams 12, 14, converge to a focused spot at a distance of one focal length beyond lens 62. However, since diffraction effects render the rays of a laser beam parallel, at the focal point, the focal length $f_1$ for lens 62 is made sufficiently long to provide a region of essentially parallel rays through page deflector 64, if required by the type of deflector used.

FIG. 1 illustrates the distribution or spacing of the data and reference beams 12, 14 at the entrance plane 68 to the page deflector 64. In this entrance plane 68, which is perpendicular to the optical axis 27 and located one focal length beyond the first lens 62, the reference beam 14 arrives at a fixed location such as 70 while the position or location 72 where the focused data beam 12 arrives is determined by the specific deflection by the data deflector 37.

For example, with a data deflector 37 as described above, there is an array of 500 by 500 possible discrete data positions at entrance plane 68 through which the data beam 12 may pass. The area 74 through which the data beam 12 may pass is outlined in the form of a square with dashed lines 76.

The array of positions enclosed by lines 76 corresponds to the data "page" to be stored in the memory or recording medium 18. The area 74 differs from the conventional previously described "page composer" in that there is no physical object necessary, for temporary storage. Rather, the complete set of possible data light beam positions in area 74 effectively constitutes the page of data bits. It is this plane in space or area 74, after all of the data bits have been holographically recorded, which will later be reconstructed from the plurality of individual data bit holograms and projected by another lens onto detector 22 for read-out.

In order to direct the light from the virtual page plane 68 onto a specific small area in the memory recording plane 20, the page deflector 64 is placed with its center of deflection 78 on the optical axis 27 and at entrance plane 68. A page address signal from network 66 causes page deflector 64 to deflect equally both the data and reference beams 12, 14 into a direction where a second lens 80 can bring the beams together onto the desired storing spot, such as 82, on the recording medium 18.

The size of the illuminated spot 82 is a function of the focal length, $f_2$, of lens 80 and its position relative to page deflector 64 and storage plane 20 and recording medium 18. Since the data and reference beams 12, 14 are parallel to each other, they are brought together by lens 80 to intersect in lens 80's back focal plane, the same as plane 20, at one focal length $f_2$ behind lens 80. The recording medium 18 is located in the back focal plane 20 so that, independent of the deflection direction by page deflector 64, the beams 12, 14 will intersect somewhere on medium 18. The location of the intersection of the beams 12, 14 on medium 18 is dependent upon the deflections introduced by page deflector 64, while the angle of intersection is determined by data deflector 37. The storage medium 18 may be formed of any material which responds to exposure to light by yielding a change in its optical density or optical path length, e.g., by changing its index of refraction, and in which the pattern created due to one exposure is added to, but not erased by, succeeding exposures since thousands of individual bit hologram exposures may be super-imposed to synthesize a single page of digital data. Those qualities are possessed by the majority of storage media used for other types of holograms. For nonerasible, read-only memories, these qualities are possessed by ordinary photographic film and other permanent recording media.

During playback or retrieval of data by apparatus 10, a detector 22, formed of an array of individual photodectors, is placed in plane 24. The array of photodetectors is so located and arranged that the reconstructed holographic data bits from a specific page location such as 82 are each projected onto an individual photodetector, such as at 86. When the data bit is "zero," or dark, no light is incident upon the photodetector 86 to produce a corresponding zero output signal on line 84. The information response may be reversed with an dark condition corresponding to a "one" data bit.

The reconstruction of the data bits at any one location 82 of the array is obtained with the illumination of location 82 by reference beam 14. In such case, page deflector 64 is controlled to deflect reference beam 14 while data beam 12 is shut off, for example, by deflecting it out of the field of the lens 62 with the data deflector 37 as shown in FIG. 3. Note that the data beam when deflected to follow the fixed path of the reference beam 14 may be used to reconstruct.

The reference beam illuminates a specific holographic page whose reconstruction of all of the stored data bits is imaged simultaneously onto detector 22. The output lines 84 from the detector 22 may then be read by electronic sensing. Various techniques may be employed for electronic sensing such as sequential sensing of each bit position one at a time or in parallel by simultaneously sampling of all lines 84.

The structural complexities which may arise with a holographic data processing system 10 in accordance with the invention can be varied depending upon the desired end results. For example, the detector 22 may be a single integrated semiconductor structure having an array of photodetectors which are directly coupled to a computer's main-frame working memory. This means that each computer memory location is not only addressable by the computer, but also by photodetectors 86. Large-scale integrated circuits (LSI) may be used to construct such an array of photodetectors which is directly coupled with a semi-conductor computer memory.

The advantages of employing a direct computer interconnection may be appreciated for example by considering an array of 100 by 100 data bits stored within each page 82 recorded on medium 18. In such case there are 10,000 bits per page, and with an array of pages of 100 by 100, a total capacity of $10^8$ bits is obtained. The entire memory mass may be conveniently accessed by a computer through control of page deflector 64 as suggested by input line 88 coupled to page address control network 66.

A short cycle time for the storage and retrieval of data bits from recording medium 18 to and from the computer memory may be obtained by incorporating a shift register into an LSI photodetector 22. Thus, after the computer main frame has been supplied with input page data in parallel from the array of photodetectors 22 and the data of the page has been processed by the computer, the processed data is transferred back in parallel to the shift register to empty the main frame. Another page of data may then be placed in parallel into the main frame memory and processed while the processed data from the previous page is sequentially read-out from the shift register for storage on the holographic medium. One may thus make full advantage of the hologram memory's intrinsic ability to simultaneously read-out a very large block or page of data.

In the description of system 10 deflectors 37 and 64 are each represented by a pair of boxes, one for each dimension of scanning. The rays of the beams are shown at the same positions at the input and output planes of the deflectors while differing only by the angle of propagation. This is a schematic representation which does not take into account any one particular type. Most deflectors at least approximately meet, for small maximum deflection angles, the general requirement that the page array imaged at the center of deflection, reproduces an essentially stationary image as projected by the second lens 80 onto detector plane 24. This requirement assures that the image is always projected with detectors 86 in the same place relative to the position of the imaged data bit in its array. When large angles of deflection are to be employed or required, compensating optical elements may have to be incorporated to stabilize the image. One may adopt special deflection techniques whereby the deflection angles for each bit address can be made different for each page deflection angle, the difference in angles being programmed into the deflector's electronic circuitry.

During storage of data, the data beam might be monitored by sensing the outputs of appropriate photodetectors 86 in the detector plane 24 to ascertain that the beams have been deflected to the proper deflection angle. In such case beam positional errors may then be monitored and corrected by feed-back signals to the data address control on line 90. In this manner, aberrations of the recording rays arising from any of the lenses, deflectors, thermal effects, etc. may be minimized or eliminated rather than using elaborate optical compensation devices. A suitable control network 92 responsive to the signals on photodetector lines 84 and controlled by the data address signals on lines 38 and 40 may then provide the desired feed-back data beam position correction signal on line 90.

The reference and data laser beams 14, 12 are selected to provide sufficiently long coherence lengths for mutual coherence at their intersection at the storage medium 18. In the event a laser is employed which has a relatively short coherence length, conventional path-length equalization techniques can be used to insure that the beams are coherent at recording medium 18.

Lenses 62 and 80 are indicated in FIG. 1 as simple single element lenses. In practice these lenses may be much more complex consisting of several elements depending upon the design requirements of the specific holographic recording and playback apparatus 10. It should be noted that an accurate high quality feedback control network 92 to maintain the data beam in registration advantageously simplifies the entire optics and lens design.

Note that, although the angle of deflection or the entrance areas of the deflectors 37, 64 must be considerably larger for page deflector 64 than for data deflector 37, the angular deflection repeatability of both deflectors 37, 64 are of the same order of magnitude.

Several alterations to system 10 shown in FIG. 1 may be made. For example, FIG. 4 illustrates the substitution of two smaller lenses 100, 102 for the first lens 62 of FIG. 1. Lens 100 is aligned to pass reference beam 14 and the other lens 102 is located to pass the data beam 12. The use of a pair of lenses 100, 102 facilitates the lens design and significantly increases the angular separation between the reference and data beams when such separation would benefit the design for specific applications.

FIG. 5 illustrates another modification of system 10 by using a pair of page deflectors 104, 106 in replacement for the single page deflector 64 of FIG. 1. Deflector 104 is a high speed deflector, while 106 is a slow multiple beam deflector. The use of a pair of page deflectors is desired to enable increased deflection speeds. For example, when a deflector must deflect a large bundle of light rays, such as the reference beam 14 and the widely spaced data beam 12, a slower operation in comparison with deflector 64 of FIG. 1 results. Hence, during read-out, when only the reference beam 14 is deflected, the read-out speed may be high with a high-speed single beam deflector 104.

During operation of system 10 when data bits are to be entered into the holographic memory 18, data signals are applied to modulator 28 to turn the laser beam 26 on or off depending upon the code being transmitted. At the same time an address for each data bit in a page is selected with data address signals applied to data deflector 37. A page address signal is applied to page deflector 64 so that each data bit is recorded with a distinct recording or intersection angle between the data and reference beams 12, 14 and at a page location such as 82.

The power of laser beam 26, the data input rate and the time for each exposure of the storage medium 18 are selected so that the total energy per data bit exposure is approximately equal to the optimum exposure level for the recording medium 18. The appropriate laser parameters are further selected on the basis of obtaining a bright reconstructed image for read-out by the detector array 22.

Since the embodiment of system 10 in FIG. 1 directs the reference beam 14 at the same detector location 108, a photodetector at the location can be used to monitor the modulation of the beams. Such photodetector may then be used as a feed-back error signal to maintain the proper modulation as suggested by line 110 coupled to network 30.

The recording medium 18 may require chemical processing steps (such as with photographic film) to complete the recording process. In such case the removal and return of the medium 18 to system 10 requires precise registration to preserve alignment of reconstructed data bits with the array of photodetectors 86 in detector plane 24. Other materials for recording medium 18 such as lithium niobate can be read-out immediately. Still other materials may also permit the erasure of data such as by illumination by a high intensity laser, electrical stimulation from a network 112 or other processes.

Having described a holographic data recording and playback system according to the invention, the various advantages thereof can be appreciated. The requirement of an intermediate page composer has been eliminated and a high quality signal to noise ratio is obtained with the reduction of scattered light near the read-out detectors 86. As a result, the reference beam 14 may be placed near the data beam 12 to enable the use of the same optics for both beams. A higher data storage capability is obtained since the low end of the spatial frequency range may be used on the recording medium 18. laser power is efficiently used. A group of data may be recorded in a random-access sequence by simply deflecting the data beam to any specific bit position of a desired group.

What is claimed is:

1. A method for holographically processing digital data comprising the steps of producing a beam of coherent energy, modulating the beam with a bit of digital data, dividing the modulated beam into a reference beam and a data beam, deflecting the data beam by a first preselected angle selected from a first matrix array of angles maintaining the reference beam at a second preselected angle to establish a unique spatial relationship between the data beam and the reference beam, deflecting both the data beam and the reference beam by a third preselected angle selected from a second matrix array of angles, and focussing the data beam and the reference beam onto a recording medium so that the beams interfere and form a hologram of the bit of digital data in the recording medium, the third preselected angle determining the position of the hologram in the recording medium and the first and second preselected angles determining the angle of intersection of the data beam and the reference beam at the recording medium whereby the hologram of the bit of digital data has a unique address within the recording medium and may be stored in a sequential manner.

2. A method for holographically processing digital data according to claim 1, wherein there are further included the steps of occluding the data beam, deflecting the reference beam by a preselected angle selected from the second matrix array of angles, focussing the deflected reference beam on the recording medium at a desired position so that a spatial array of all bits of the digital data recorded at that location is reconstructed, the spatial array being a matrix formed by the first preselected angles selected from the first matrix of angles, and detecting the bit of digital data at a location in the spatial array.

3. A method for holographically processing digital data according to claim 1, wherein there are further included the steps of detecting the spatial position of an unrefracted portion of the reference beam beyond the recording medium, forming a signal indicative of the intensity of the unrefracted portion and adjusting the deflection of the reference beam to maintain a desired registration of the reference beam relative to the recording medium.

4. A method for holographically processing digital data according to claim 1, wherein there is further included the step of collimating the data beam and reference beam prior to the deflection by the third preselected angle.

5. A holographic digital data processing system comprising a source of a beam of coherent energy, a modulator for impressing a bit of digital data on the beam of coherent energy, a beam divider for dividing the modulated beam of coherent energy into a reference beam and a data beam, a first beam deflector which deflects the data beam by a first preselected angle selected from a first matrix array of angles means for bypassing the first beam deflector with the reference beam to establish a unique spatial relationship between the data beam and the reference beam, a second beam deflector which deflects both the data beam and the reference beam by a second preselected angle selected from a second matrix array of angles, a recording medium in which a hologram may be formed, means for focusing the data beam and the reference beam into the recording medium so that the data beam and the reference beam interfere and form a hologram of the bit of digital data in the recording medium, the second preselected angle determining the position of the hologram in the recording medium and the first preselected angle determining the angle of intersection of the data beam and the reference beam at the recording medium whereby the hologram of the bit of digital data has a unique address within the recording medium and may be stored in the recording medium in a sequential manner.

6. A holographic digital data processing system according to claim 5, wherein there is further included a fixed photodetector positioned to receive an unrefracted portion of the reference beam beyond the recording medium, means for generating a feedback signal indicative of the intensity of the unrefracted portion of the reference beam, and means for applying the feedback signal to the second beam deflector so that a desired registration of the reference beam relative to the recording medium may be maintained.

7. A holographic digital data processing system according to claim 5, wherein the recording medium is a permanent recording medium thereby forming a read-only memory.

8. A holographic digital data processing system according to claim 5, wherein the recording medium is erasible and wherein there is further included means for erasing digital data stored in the recording medium.

9. A holographic digital data processing system, according to claim 5, wherein the source of a beam of coherent energy is a laser.

10. A holographic digital data processing system according to claim 5, wherein there is further included means for occluding the data beam so that only the reference beam is focussed onto a location on the recording medium, a spatial array of all bits of digital data recorded at that location being reconstructed, the spatial array being a matrix formed by the first preselected angles selected from the first matrix of angles, and a matrix array of photodetectors located at the reconstructed spatial array, an individual photodetector being associated with each possible bit of digital data in the spatial array.

11. A holographic digital data processing system according to claim 10, wherein the means for occluding the data beam includes a means for supplying a signal to the first beam deflector to deflect the data beam out of the system.

12. A holographic digital data processing system according to claim 5, wherein the first and second beam deflectors are acousto-optic beam deflectors.

13. A holographic digital data processing system according to claim 12, wherein there is further included means for collimating the data beam and the reference beam prior to entrance into the second beam deflector.

14. A holographic digital data processing system, according to claim 13, wherein the means for bypassing is a plurality of reflective elements for diverting the reference beam around the first beam deflector.

* * * * *